Sept. 29, 1970  W. O. CHRISTIANSON ET AL  3,531,765
AIRCRAFT APPROACH LIGHTING SEQUENCING SYSTEM
Filed May 6, 1968  3 Sheets-Sheet 1
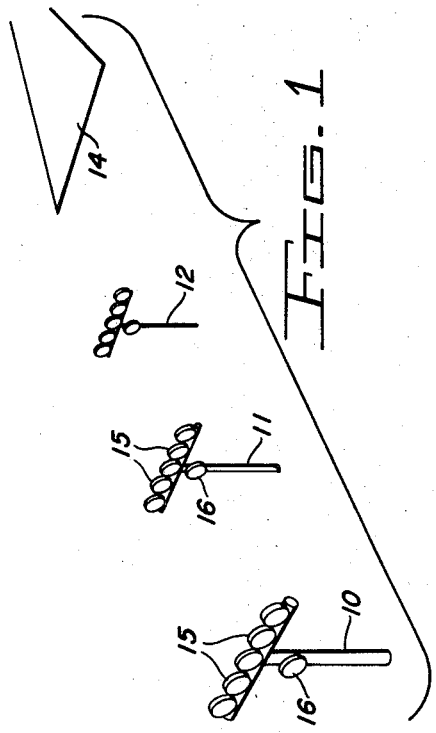
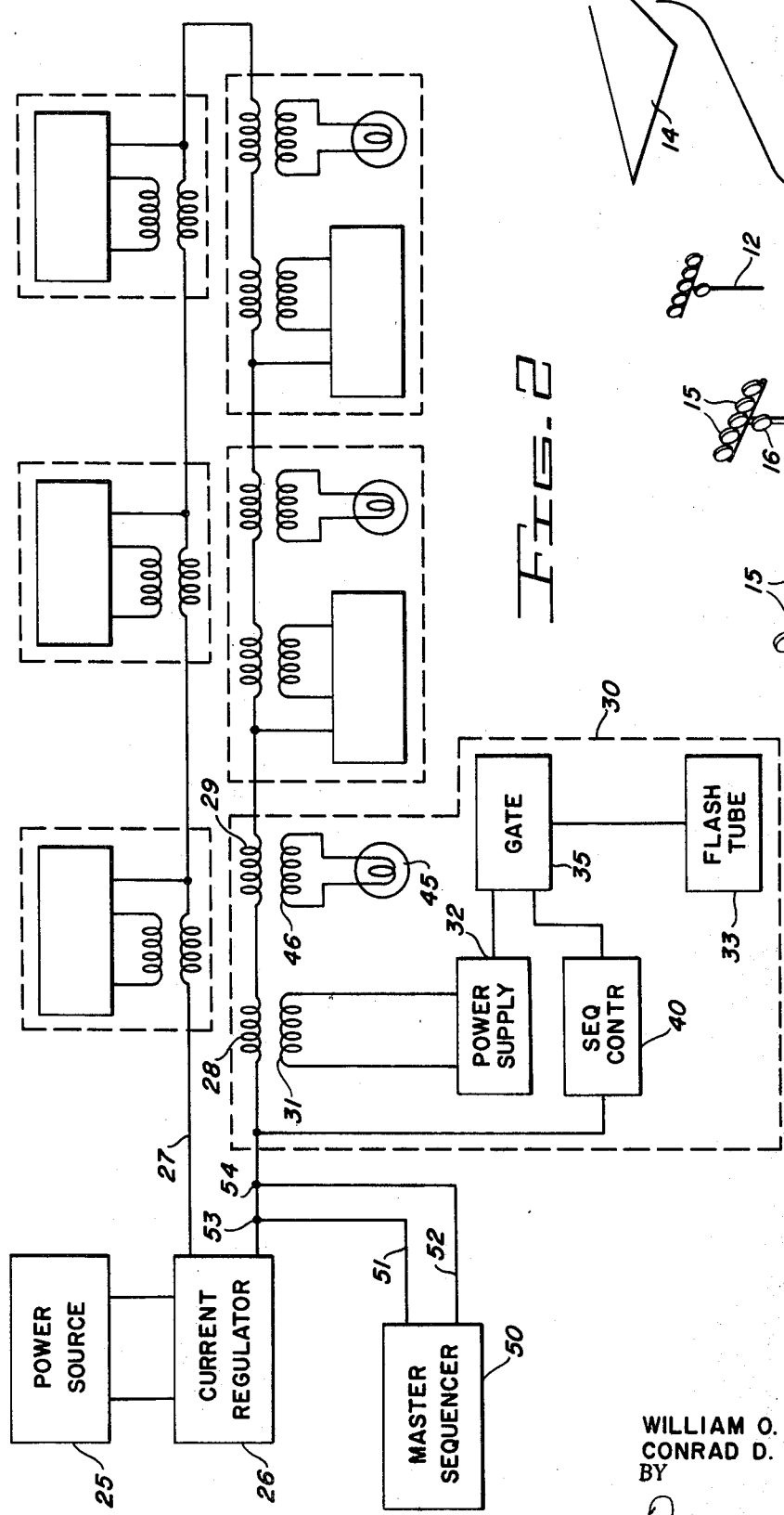
INVENTOR.
WILLIAM O. CHRISTIANSON
CONRAD D. HELLIKER
BY
Drummond & Cahill
ATTORNEYS

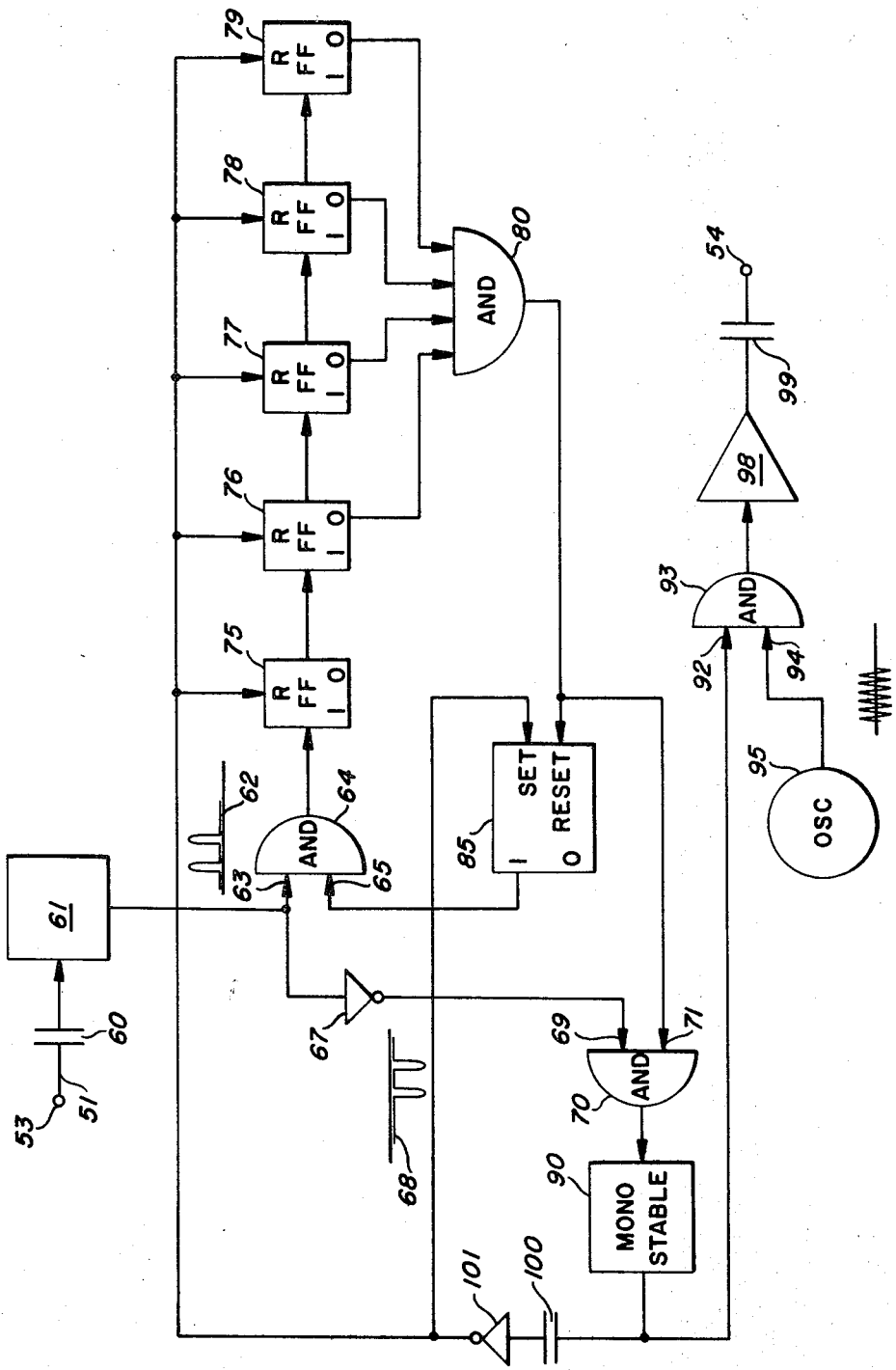

United States Patent Office 3,531,765
Patented Sept. 29, 1970

3,531,765
AIRCRAFT APPROACH LIGHTING SEQUENCING SYSTEM
William O. Christianson, Litchfield Park, and Conrad Dean Helliker, Phoenix, Ariz., assignors to UMC Industries, Inc., a corporation of Delaware
Filed May 6, 1968, Ser. No. 726,961
Int. Cl. B64f 1/18
U.S. Cl. 340—26          4 Claims

ABSTRACT OF THE DISCLOSURE

A system for sequencing approach lights for aircraft utilizing a first frequency for counting and lighting power and a second frequency for controlling counters positioned at each flashing light location.

---

Approach lighting is a necessary concomitant to modern aircraft and airport traffic problems. The lighting systems guide aircraft on approaches and are necessary both in heavily populated areas where many lights are present in the vicinity of the airport, and also when the visibility is low. Aircraft can be guided on instruments and by radar to final approach, but it is difficult in the last minutes of the approach to touch-down to substitute other controls for visual control. Incandescent lamps have been utilized to indicate the approach to a runway and are typically mounted on a tower at 100-foot intervals. These continuously energized lamps may have variable brightness to compensate for ambient light and may extend from 2100 to 2800 feet from the runway in the direction of the approach. Each tower generally ranges from three to twenty feet in height, depending on the surrounding terrain and circumstances of the individual airport. Each tower characteristically utilizes five incandescent lamps arranged in a bank and displaced horizontally across the top of the tower.

In very poor visibility and inclement weather conditions, xenon flash tubes have been utilized to mark the approach to a runway since the brightness of the tube greatly exceeds that obtainable by incandescent lamps. Substantial difficulty has been encountered with the expense involved in providing a flash tube system and particularly with the sequencing thereof. Separate cables are characteristically required for each flash tube and a complicated and expensive mechanical switching system has been used to obtain proper sequencing.

It is therefore an object of the present invention to provide an aircraft approach lighting system utilizing flash tubes.

It is another object of the present invention to provide an aircraft approach lighting system incorporating a sequencing system for sequencing flash tubes without the necessity of separate wiring for the flash tubes.

It is still another object of the present invention to provide an aircraft approach lighting sequencing system operating on a dual frequency.

These and other advantages of the present invention will become apparent to those skilled in the art as the description thereof proceeds.

Briefly, in accordance with the embodiment chosen for illustration, a power source, which may typically be the source utilized to provide energy to the incandescent lamps, is provided and operates at a given frequency. A master sequencer is connected to the power line of the system and counts a predetermined number of cycles of the power frequency. The master sequencer also includes a continuously operating oscillator generating a second frequency which is gated at intervals to the power line in accordance with a count of the cycles of the power frequency. A sequence controller is associated with a flash tube at each approach lighting tower and counts the cycles of the power frequency. A predetermined count, different for each station, is decoded from the counter and utilized to gate power to the associated flash tube while receipt of the high frequency from the master sequencer on the power line resets the counter of the sequence controller.

The present invention may more readily be described by reference to the accompanying drawings, in which:

FIG. 1 is a pictorial illustration of a portion of an approach lighting system useful in showing the physical arrangement of the lights in the system.

FIG. 2 is a block diagram of an approach lighting system incorporating the teachings of the present invention.

FIG. 3 is a block diagram of a master sequencer constructed in accordance with the teachings of the present invention.

Figure 4:
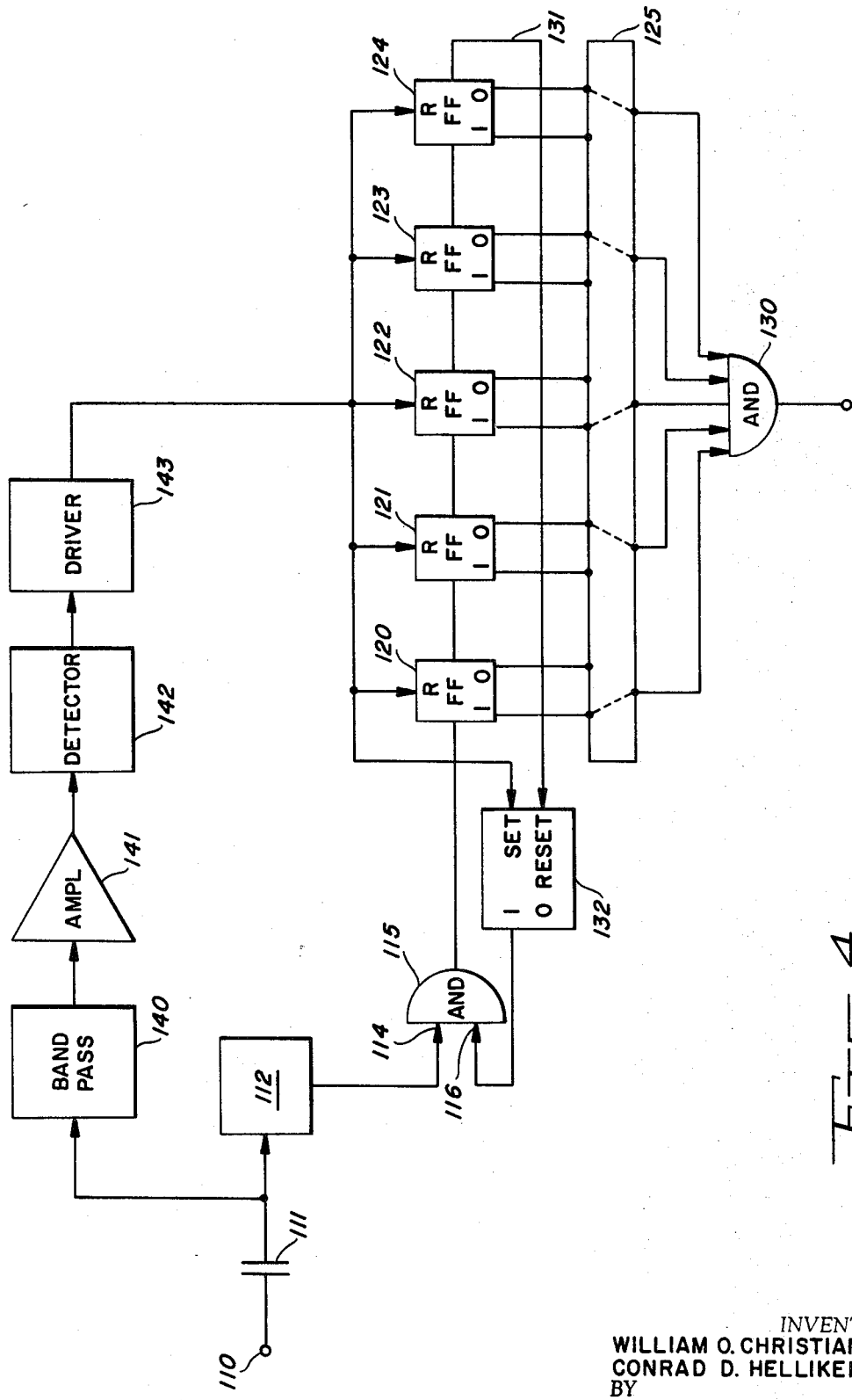
FIG. 4 is a block diagram of a sequence controller constructed in accordance with the teachings of the present invention.

Referring now to FIG. 1, towers 10, 11 and 12 are pictorially represented at appropriate intervals approaching a runway 14. Although only three towers are shown and each is of the same height, it will be apparent from the discussion above that from 21 to 28 such towers will be present of varying height. Each tower includes a bank of five incandescent lamps 15 positioned across the top thereof. These incandescent lamps are characteristically of variable intensity as described previously. A flash tube 16 is mounted on each tower and is gated to produce a bright pulse of light of predetermined duration and at predetermined intervals so that the approaching aircraft observes "traveling" light flashes in the direction of the runway.

Referring now to FIG. 2, an approach lighting power source 25 is shown connected to a current regulator 26. In approach lighting systems, it is common to utilize series circuits in a manner not unlike that used for street lighting and wherein a current regulator is a necessary element of the system. Typically, the voltage output will range around 5,000 volts with the current of 5 to 20 amps. The current regulator is connected to a power line 27 which feeds a plurality of transformer primary windings, such as shown at 28 and 29, all of which are connected in series. Each of the dashed-line enclosures are identical and therefore only the enclosure 30 includes a block diagram of the contents therein. Secondary winding 31 provides power to a power supply 32 and is utilized to appropriately alter the voltage for the flash tube 33. The power is applied to the flash tube 33 from the power supply 32 through a gate 35. The gate 35 and power supply 32 are of conventional design, the gate being merely a silicon-controlled rectifier circuit that closes the circuit between the power supply and the flash tube upon the application of the gating signal thereto. A sequence controller 40 is connected directly to the power line 27 and provides the gating signal to the gate 35, as will be described hereinafter. The enclosure 30 represents the apparatus found in each one of the towers 10, 11 and 12 of FIG. 1; however, to reduce the complexity of the drawing, only one incandescent lamp 45 is shown receiving power from the power line through the secondary winding 46.

A master sequencer 50 is connected through conductors 51 and 52 to the power line 27 at terminals 53 and 54 respectively. Two conductors are utilized to connect the sequencer 50 to the power line 27 to facilitate the description thereof. It will be obvious to those skilled in the art that a single conductor may be substituted for the two.

Referring now to FIG. 3, the master sequencer 50 of FIG. 2 will be described in detail. The terminal 53 and conductor 51 apply power at power frequency (usually 60 Hz.) through a coupling capacitor 60 to a pulse shaper circuit 61. The pulse shaper circuit is a conventional circuit which may utilize a unijunction transistor and simply produce a positive pulse of short duration for each positive half-cycle of the alternating voltage applied thereto. Such circuits are found in conventional texts, such as the General Electric Transistor Manual, Seventh Edition, and similar manuals of other manufacturers. The pulse waveform is generally indicated at 62; this pulse is applied to the input terminal 63 of a two input AND gate 64. The pulse is also inverted by an inverter 67, which therefore produces a pulse shape generally indicated at 68. The inverted pulse 68 is applied to terminal 69 of a second two input AND gate 70. A binary counter comprising flip-flops 75, 76, 77, 78 and 79 are interconnected and count the number of pulses received from AND gate 64. The outputs of the flip-flops 76–79 are applied to an AND gate 80 which, as will be apparent to those skilled in the art, will be enabled when the counter reaches the count of 30. When AND gate 80 is enabled, flip-flop 85 is reset and the "1" output thereof which was formerly at a high level, thus enabling the AND gate 64, is now reduced and the AND gate 64 is disabled. The output of AND gate 80 is also applied to the terminal 71 of the AND gate 70. It may be noted that the inverted pulse 68 enables the AND gate 70 during the "non-negative" portion of the pulse, thereby presenting a substantial interval during which the AND gate 70 may be gated by the application of a signal from AND gate 80. The output of AND gate 70 is applied to a monostable multivibrator 90 to cause the latter to produce a control signal and apply the control signal to terminal 92 of a two input AND gate 93.

A continuously running oscillator 95 is connected to terminal 94 of the AND gate 93; therefore, when the control signal is applied to terminal 92, the relatively high frequency signal from the oscillator 95 is passed through the AND gate 93 to an amplifier 98 and subsequently through a coupling capacitor 99 to the terminal 54 (the later being connected to the power line 27 of FIG. 2).

The control signal of the monostable multivibrator 90 is also coupled through a capacitor 100, is inverted in an from inverter 101 is also applied to each of the flip-flops flip-flop 85 to cause the latter to return to its "1" output state to thereby enable AND gate 64. The inverted signal from inverter 101 is also applied to each of the flip-flops 75–79 to cause the latter to reset.

Referring now to FIG. 4, the sequence controller 40 of FIG. 2 is shown in detail. The terminal 110 is connected to the power line 27 of FIG. 2 and couples power from the latter through coupling capacitor 111 to a pulse shaper 112. The pulse shaper 112 is similar to the pulse shaper 61 of FIG. 3 and the comments relating to the latter are equally applicable to the former. Output pulses from the pulse shaper 112 are applied to terminal 114 of two input AND gate 115. The output of AND gate 115 is applied to a binary counter comprising flip-flops 120, 121, 122, 123 and 124. The outputs from the flip-flops 120–124 of the binary counter are connected to a decoding board 125 which may be formed by any convenient technique, such as printed wiring board methods. The decoding board connects selected output terminals of the respective counter flip-flops 120–124 to a five input AND gate 130. The decoding board 125 will be adequate for each sequence controller utilized in the aircraft approach lighting sequencing system of the present invention. The decoding board 125 is shown in the embodiment chosen for illustration for decoding the number 26. Therefore, when 26 pulses have been received from AND gate 155, AND gate 130 is enabled.

Signals received through the coupling capacitor 111 are also applied to a band pass filter 140, amplifier 141, detector 142, and driver 143. These latter elements detect the existence of the higher frequency provided by the oscillator 95 of FIG. 3 and develop a resetting signal which is applied to each of the flip-flops 120–124. It may be noted that if the binary counter comprising flip-flops 120–124 achieves a maximum count, i.e., flip-flop 124 changes state from "0" to "1," indicating a count of 32, that a positive pulse is provided on conductor 131 which is applied to flip-flop 132, causing the latter to reset. While flip-flop 132 is in the reset condition, no positive output therefrom is applied to the AND gate 115 and the counter is therefore "off" and not counting. To cause the counter to begin counting again, it is first necessary for the sequence controller of FIG. 4 to receive the high frequency signal from the master sequencer of FIG. 3. The receipt of the high frequency signal would result in the resetting of the flip-flops 120–124 as described previously, as well as the setting of the flip-flop 132 causing the latter to provide an enabling signal to AND gate 115.

In operation, the system of the present invention may be described as follows. A master sequencer 50 is connected to the power line 27 providing power to each of the towers 10, 11, 12, etc. of an aircraft approach lighting system. The incandescent lamps 15 of the banks on each tower are thus provided with power at a conventional frequency, such as 60 Hz. When flash tubes 16 are to be utilized and are to be sequenced, the master sequencer 50 is utilized to provide a second frequency detectable by the sequence controller 40 positioned at each of the towers. The master sequencer counts the cycles on the power line 27 in the binary counter comprising interconnected flip-flops 75–79. Upon attainment of a predetermined count, a count of 30 in the embodiment chosen for illustration, a signal is generated that triggers a monostable multivibrator. The output of the monostable multivibrator is utilized as a signal for a predetermined duration (e.g., 4 milliseconds) and gates a high frequency signal onto the power line. The high frequency signal is provided by an oscillator 95 which, for example, may be generating a suitable frequency of 100 kHz.

Each of the sequence controllers, such as the sequence controller of FIG. 4, is connected to power line 27 and counts the cycles thereof. Each of the sequence controllers is programmed by means of a decoding board, such as that shown at 125 of FIG. 4, to produce a gating signal at a different count (the one chosen for illustration is a count of 26). The gating signal is applied to the gate 35 of FIG. 2, thereby applying power from a power supply to the flash tube 33 associated with the controller 40. Before the counter in the sequence controller can count to its maximum of 32, a high frequency signal should be received as a superimposed signal on the power line 27. This high frequency signal will be detected and amplified and utilized as a resetting signal for the flip-flops 120–124 of the sequence controller counter. In the event no superimposed frequency is detected, the counter will continue to count and upon reaching its maximum count of 32 will apply a stopping signal to flip-flop 132, thus inhibiting further counting and preventing further energization of the flash tube associated with that particular sequence controller.

By selecting the appropriate decode board with each of the sequence controllers, the flash tubes may be made to flash in any desired sequence and continue to flash in that sequence until control signals fail to gate the higher frequency to the power line. In the block diagrams utilized for the description of the present invention, no description was given of obvious details which will be readily apparent to those skilled in the art. For example, it is necessary to derive power for the operation of the oscillator, amplifiers, and various logic elements. Further, the contents of each of the blocks are well recognized elements and circuits commonly used in electronic technology, the details of which are readily available in standard handbooks and texts.

It will be apparent to those skilled in the art that many modifications may be made, such as voltages, currents, frequencies, etc., in the embodiment chosen for illustration without departing from the spirit and scope of the invention. It is therefore intended that the present invention be limited only by the scope of the claims appended hereto.

What is claimed is:

1. An aircraft approach lighting sequencing system comprising: a power source for supplying alternating current of a predetermined frequency to a power line; a master sequencer connected to said power line, said master sequencer responsive to said predetermined frequency for counting the cycles thereof and for generating a control signal at a predetermined count, said master sequencer also including an oscillator for continuously generating an alternating current of a second frequency and means responsive to said control signal for gating said second frequency to said power line for a predetermined duration; a plurality of sequence controllers connected to said power line, each including counting means for counting the cycles of said predetermined frequency and each responsive to a different predetermined count for generating a gating signal, each of said sequence controllers including means responsive to said second frequency for resetting said counting means; a plurality of flash tubes; a plurality of gate means, each connected to a different one of said sequence controllers and to a different one of said flash tubes, and each responsive to a gating signal from the connected sequence controller for applying current from said power line to the flash tube connected thereto.

2. The combination set forth in claim 1 wherein said approach lighting sequencing system includes a plurality of incandescent lamp banks, each connected to said power line for continuous operation and wherein each flash tube is positioned with a different one of said banks.

3. The combination set forth in claim 1 wherein said counting means comprises a multiple stage binary and wherein a maximum count of said counter generates a stop signal, and stop means responsive to said stop signal in each of said sequence controllers for inhibiting further counting.

4. The combination set forth in claim 3 wherein each of said sequence controllers includes means responsive to said second frequency for inhibiting said stop means.

References Cited

UNITED STATES PATENTS

| | | | |
|---|---|---|---|
| 2,794,967 | 6/1957 | Coggins et al. | 340—26 |
| 2,797,367 | 6/1957 | Scott et al. | 340—26 |

ALVIN H. WARING, Primary Examiner

H. S. COHEN, Assistant Examiner

U.S. Cl. X.R.
315—76; 340—25